United States Patent [19]

Funahashi et al.

[11] Patent Number: 4,668,298

[45] Date of Patent: May 26, 1987

[54] COATING COMPOSITION FOR PREVENTING HIGH TEMPERATURE OXIDATION FOR ELECTRODES

[75] Inventors: Kazutomi Funahashi; Koichi Yoshii, both of Omigawa; Yoichi Nakamura, Satte; Tatsumi Oshikiri, Toda; Hajime Kobayashi, Soka, all of Japan

[73] Assignee: Mitsumaru Chemical & Synthetic Industrial Co., Ltd., Tokyo, Japan

[21] Appl. No.: 874,510

[22] Filed: Jun. 16, 1986

Related U.S. Application Data

[63] Continuation-in-part of Ser. No. 676,577, Nov. 30, 1984, abandoned.

[30] Foreign Application Priority Data

Nov. 30, 1983 [JP] Japan ................................ 58-224281

[51] Int. Cl.$^4$ ................................................ C07G 1/00

[52] U.S. Cl. .......................... 106/287.13; 106/287.23; 106/286.8; 501/92; 373/88

[58] Field of Search ...................... 106/287.13, 287.11, 106/286.8, 287.17, 287.23, 287.29, 287.34; 501/92, 93; 427/61, 126.3; 252/502; 373/88, 96

[56] References Cited

U.S. PATENT DOCUMENTS

| | | | |
|---|---|---|---|
| 4,185,136 | 1/1980 | Wasserman | 427/61 |
| 4,289,538 | 9/1985 | Orso | 106/286.8 |

OTHER PUBLICATIONS

Chem. Abst. 64:6183g, 1965, Novikov.

*Primary Examiner*—Josephine L. Barr
*Attorney, Agent, or Firm*—Kane, Dalsimer, Kane, Sullivan and Kurucz

[57] ABSTRACT

The invention relates to a coating composition containing ceramic components, for preventing high temperature oxidation of graphite electrodes employed in electric furnace steelmaking. This ceramic composition consists of the following components:

(a) 40–75% by weight of silicon carbide as a heat radiation component;

(b) 15–40% by weight of a binding and heat radiation promoting component consisting of
3–20 parts by weight of silicon nitride,
5–20 parts by weight of salt of phosphorous-containing acid,
2–10 parts by weight of chromium oxide,
2–10 parts by weight of tantalum carbide, and
5–20 parts by weight of pulverous aluminum;

(c) 10–35% by weight of an additive for improving the adhesion to the graphite electrode and increasing the binding strength between the coated layers, consisting of
1–10 parts by weight of aluminum oxide,
3–15 parts by weight of glass powder,
3–15 parts by weight of zirconium oxide,
1–10 parts by weight of silicon dioxide,
1–10 parts by weight of magnesium oxide, and
1–10 parts by weight of iron oxide;

(d) 5–20% by weight of a metal powder consisting of
0–40 parts by weight of pulverous copper,
0–40 parts by weight of pulverous nickel,
0–40 parts by weight of pulverous stainless steel,
0–40 parts by weight of pulverous iron, and
0–40 parts by weight of pulverous tin;

(e) 2–5% by weight of a sintering promoter mixture consisting of
10–30 parts by weight of silver carbonate, and
30–50 parts by weight of copper sulfate, and/or
30–50 parts by weight of iron sulfate; and (f) 3–7% by weight of a melting point lowering component consisting of
30–60 parts by weight of iron fluoride, and
40–70 parts by weight of copper fluoride.

3 Claims, No Drawings

COATING COMPOSITION FOR PREVENTING HIGH TEMPERATURE OXIDATION FOR ELECTRODES

CROSS-REFERENCE TO RELATED APPLICATION

This application is a continuation-in-part of copending U.S. application Ser. No. 676,577 filed Nov. 30, 1984, now abandoned.

BACKGROUND OF THE INVENTION

1. Field of the Invention

The present invention relates to a coating composition containing ceramic components, for preventing high temperature oxidation and which is useful when applied to graphite electrodes employed in electric furnace steelmaking.

2. Description of the Prior Art

Heretofore, it has been attempted to prevent high temperature oxidation of graphite electrodes used in electric furnace steelmaking, by coating it with a special paint.

For instance, a paint for preventing oxidation of graphite electrodes has been known from Japanese Patent Publication No. 25256/1979. The paint consists of a base powder, silica, a fluoride (or a powdery low melting component) and a dispersion aid. However, this oxidation preventing paint has practically little effect due to the occurrence of severe scaling off of the coated layer. Indeed this paint, as shown with a comparison test, results in about 80% of the coated layer placed on a graphite electrode falling off after the first charge (after about two hours' operation of the electrode; see Comparison Example 3 given below). Higher permeability and adhesion together with higher heat resistance and higher throwing power are required for these paints, in order to persist against thermal shocks, since the graphite electrode will very often encounter sudden temperature changes with temperature differences varying in a wide range during operation.

Previously a heat radiative ceramic coating composition exhibiting a heat resistivity of over 1,850° C. and excellent adhesion, for use in refractory internal walls of industrial heating furnaces and for metal constructions in furnaces, was proposed by our prior Japanese Patent Application No. 187,695/1981. This ceramic composition consists of the following three components:

(a) 40–75% by weight of silicon carbide as heat radiation component,
(b) 15–40% by weight of a heat radiation promoting and binding component consisting of
  3–20 parts by weight of silicon nitride,
  5–20 parts by weight of salt of phosphorous-containing acid,
  2–10 parts by weight of chromium oxide,
  2–10 parts by weight of tantalum carbide, and
  5–20 parts by weight of pulverous aluminum, and
(c) 10–35% by weight of an additive for increasing the adhesion and binding strength between the coated layers, consisting of
  1–10 parts by weight of aluminum oxide,
  3–15 parts by weight of glass powder,
  3–15 parts by weight of zirconium oxide,
  1–10 parts by weight of silicon dioxide,
  1–10 parts by weight of magnesium oxide, and 1–10 parts by weight of iron oxide.

Using this heat radiative ceramic coating composition however, one was not able to attain a coating layer having very high gas-tightness (required for the graphite electrodes). This coating composition, as will be shown afterwards in the Comparison Examples will scale off to an extent of 60–80% after two or three charges in operation of the electrode.

The present invention provides an excellent coating composition for preventing the high temperature oxidation of graphite electrodes, and which will provide a steelmaking graphite electrode with a burnt coated layer exhibiting excellent adhesion and superior gas-tightness.

BRIEF SUMMARY OF THE INVENTION

The invention comprises a coating composition for preventing high temperature oxidation of graphite electrodes characterized in that it comprises:

(a) 40–75% by weight of silicon carbide as a heat radiation component;
(b) 15–40% by weight of a binding heat radiation promoting component consisting of
  3–20 parts by weight of silicon nitride,
  5–20 parts by weight of a salt of phosphorouscontaining acid,
  2–10 parts by weight of chromium oxide,
  2–10 parts by weight of tantalum carbide, and
  5–20 parts by weight of pulverous aluminum;
(c) 10–35% by weight of an additive for improving the adhesion to the graphite electrode and increasing the binding strength between the coated layers, consisting of
  1–10 parts by weight of aluminum oxide,
  3–15 parts by weight of glass powder,
  3–15 parts by weight of zirconium oxide,
  1–10 parts by weight of silicon dioxide,
  1–10 parts by weight of magnesium oxide, and
  1–10 parts by weight of iron oxide;
(d) 5–20% by weight of a metal powder consisting of
  0–40 parts by weight of pulverous copper,
  0–40 parts by weight of pulverous nickel,
  0–40 parts by weight of pulverous stainless steel,
  0–40 parts by weight of pulverous iron, and
  0–40 parts by weight pulverous tin;
(e) 2–5% by weight of a sintering promoter mixture consisting of
  10–30 parts by weight of silver carbonate, and
  30–50 parts by weight of copper sulfate, and/or
  30–50 parts by weight of iron sulfate; and
(f) 3–7% by weight of a melting point lowering component consisting of
  30–60 parts by weight of iron fluoride, and
  40–70 parts by weight of copper fluoride, wherein the total of the above components (a)–(f) add up to 100% by weight.

DETAILED DESCRIPTION OF THE INVENTION

Silicon carbide as the heat radiative component (a) should have a particularly high emissivity (an overall emissivity of 0.92 at a temperature between 20° and 800° C.) and the requisite amount thereof to be incorporated in the coating composition should be within the range of from 40 to 75%, especially from 40 to 65%, based on the total weight of the components (a) to (f) [denoted hereinafter as the entire components]. If this is over the upper limit of 75% by weight, the layer of the coating composition coated on a graphite electrode, when being fired, will become difficult to follow especially the thermal expansion of the graphite electrode, which will cause the scaling off of the coated layer. If the proportion of this component (a) is short of 40% by weight, the heat radiant property and the heat conductivity of the coated layer become considerably inferior, so that the desired rate of energy radiation cannot be attained.

The component (b) which functions as a heat radiation promoter and as a binder for the coating should be present in the coating composition in the range of from 15 to 40%, especially from 15 to 35%, based on the total weight of the entire components. The constituent compounds constituting the component (b) and each specific proportion thereof are: 3–20 parts by weight of silicon nitride, 5–20 parts by weight of a salt of phosphorous-containing acid such as phosphorous acid, hypophosphorous acid and phosphoric acid, 2–10 parts by weight of chromium oxide, 2–10 parts by weight of tantalum carbide and 5–20 parts by weight of aluminum metal powder.

If the proportion of each specific constituent compound in the component (b) is outside of the above described range, no desirable heat radiant property is achieved.

Thus, if silicon nitride is present in an amount less than 3 parts by weight, the gas-tightness of the coated layer becomes worse and, in addition, the effective duration of the heat radiant property of the coated layer will be decreased considerably. If the content of the phosphate is less than 5 parts by weight, the adhesive strength on the substrate graphite becomes debased. When the content of chromium oxide is less than 2 parts by weight, that of tantalum carbide is less than 2 parts by weight and that of aluminum metal powder is less than 5 parts by weight respectively, no desired heat conductivity can be attained and the adhesion to the substrate becomes inferior. The component (c) should be present in an amount within the range of from 10 to 35%, preferably from 10 to 18%, based on the total weight of the entire composition. The proportions of the constituent compounds in the component (c) should be at least: 5 parts by weight of magnesium oxide, 10 parts by weight each for aluminum oxide, iron oxide and silicon dioxide and 15 parts by weight each for zirconium oxide and glass powder. If these lower limits are not used, a burnt coated layer with high gas-tightness of the heat radiant aggregate cannot be obtained.

When the proportions of aluminum oxide, magnesium oxide, iron oxide and silicon dioxide are less than 1 part by weight and the proportions of zirconium oxide and glass powder are short of 3 parts by weight, a composition with higher stability and higher adhesive strength cannot be obtained.

The proportion of the metal powder component (d) can be varied within the range of from 5 to 20%, preferably from 5.5 to 18%, based on the total weight of the composition. This component contributes to an improvement of the adhesion and of the permeating ability by melting upon the heating of the coated layer, resulting in an enhancement of the gastightness. If the proportion of this component is higher than 20% by weight, there may appear a danger of burning thereof by a violent oxidation upon the heating of the coated layer and thus the adhesion of the coated layer may be deteriorated. It is advantageous, in particular, when all the metals recited as the constituents of this component are present simultaneously in the metal powder or when all the metals other than stainless steel are present in the metal powder. However, it is possible to dispense with part of the metals.

It is necessary to include the sintering promoting component (e) in a proportion within the range of from 2 to 5%, based on the total weight of the composition. Silver carbonate should not be contained in excess of the upper limit of 30 parts by weight and the content of each of copper sulfate and/or iron sulfate must not exceed the upper limit of 50 parts by weight. No additional effect will be realized, when these constituent compounds are present in excess of the above defined upper limits. When the amount of silver carbonate is less than 10 parts by weight and that of copper sulfate and/or iron sulfate is short of 30 parts by weight, they do not function as the sintering promoter for the ceramic components, so that a sintered coated layer having sufficient strength cannot be obtained.

Finally, as for the component (f), this should be included in a proportion within the range of from 3 to 7%, based on the total weight of the composition. This component imparts a melting point lowering effect to the coating composition. If the amount of iron fluoride (which is one of the constituents of this component) exceeds 60 parts by weight and the amount of copper fluoride which is also a constituent of this component surpasses 70 parts by weight, the softening point of the coated layer will be lower than 1,500° C., so that it may become fluid and fall off. When the content of iron fluoride is less than 30 parts by weight or when the proportion of copper fluoride is short of 40 parts by weight, a sufficient lowering of the melting point cannot be attained.

While there is no limitation in the amount of coating composition applied onto the graphite electrode, it has been preferred that the coating composition is applied in a thickness of 0.5–1.0 mm.

For the application, conventional methods, for example, spraying, brush coating, dipping and so on, can be adopted. In some cases, it may be possible to apply it in situ while the electrode is operated. The sintering can be effected directly by the heat inside the furnace during the operation of the electrode.

The present invention is further described below by way of Examples.

The glass powder used in the Example and the Comparative Examples is a mixture of CCF-150 and CCF-325 (which are both tradenames of Nippon Sheet Glass Co., Ltd., Osaka) in a weight ratio of 1:1. The glass of the above tradenames have the under-mentioned properties and composition, in which only distributions of particle size are different from each other:

| | CCF-150 | CCF-325 |
|---|---|---|
| Density: | 2.52 | |
| Thickness: | about 3$\mu$ | |
| Particle size: | not greater than 48 mesh < 5%<br>48~325 mesh > 70% | <12% |
| | >325 mesh < 25% | >88% |
| Softening point: | 749° C. | " |
| Melting point: | 1200° C. | " |
| Composition: | (CCF-325 has the same composition as CCF-150) | |
| | $SiO_2$ 64.6%, $Al_2O_3$ $Fe_2O_3$ | 4.1% |
| | CaO 13.4%, MgO | 3.3% |
| | $B_2O_3$ 4.7%, $Na_2O_3$ | 9.6% |

-continued

| CCF-150 | CCF-325 |
|---|---|
| $K_2O$ | |
| BaO 0.9% | |

The above-mentioned CCF-mixture softens and melts at a temperature of 500°–1000° C.

EXAMPLE 1

Coating compositions with sample numbers 1 to 8 recited in Table 1 below were prepared under admixing with 15 parts by weight of water. The numerals for each component recited in Table 1 represent the amounts thereof in terms of part by weight. Each of the so obtained coating compositions was applied on a steelmaking graphite electrode having a length of 1,800 mm and a diameter of 20 inches by means of air-spray from underneath the holder thereof at a rate of 1,000 g/m$^2$. After drying for 2 hours at room temperature, the so coated electrode was installed for operation.

While it was observed that one single steelmaking graphite electrode with no coating had been consumed after 7.7 charges in operation, the electrode coated with the coating composition of the invention showed an elongation of life. Thus, for example, the sample electrode No. 1 persisted after 8.6 charges, which corresponds to a life elongation of 11.7%. In all the samples according to the present invention, no scaling off of the coated layer was observed after 3–4 charges. The rates of life elongation for the other samples were observed to be from 8.0 to 13.8%.

TABLE 1

| | Sample No. | | | | | | | |
|---|---|---|---|---|---|---|---|---|
| Composition | 1 | 2 | 3 | 4 | 5 | 6 | 7 | 8 |
| (a) SiC | 40.0 | 42.0 | 45.0 | 45.0 | 50.0 | 55.0 | 60.0 | 63.0 |
| (b) $Si_3N_4$ | 19.0 | 5.0 | 8.0 | 5.0 | 5.0 | 6 | 5 | 3 |
| $Al(H_2PO_4)_3$ | 8.0 | 5.0 | 9.0 | 3.0 | 5.0 | 5 | 3 | 5 |
| $Cr_2O_3$ | 1.0 | 2.0 | 3.0 | 2.0 | 2.0 | 3 | 2 | 2 |
| TaC | 1.0 | 3.0 | 2.0 | 5.0 | 2.0 | 2 | 1 | 2 |
| Al Powder | 3.0 | 2.0 | 3.0 | 3.0 | 1.0 | 2 | 4 | 3 |
| (c) $Al_2O_3$ | 3.0 | 2.0 | 1.0 | 3.0 | 4.0 | 1 | 2 | 1 |
| MgO | 2.0 | 1.0 | 2.0 | 1.0 | 3.0 | 2 | 4 | 1 |
| $Fe_2O_3$ | 3.0 | 2.0 | 1.0 | 2.0 | 1.0 | 3 | 2 | 3 |
| $ZrO_2$ | 3.0 | 5.0 | 2.0 | 2.0 | 3.0 | 2 | 1 | 2 |
| $SiO_2$ | 2.0 | 3.0 | 2.0 | 1.0 | 1.0 | 1 | 2 | 1 |
| Glass powder | 2.0 | 7.0 | 3.0 | 2.0 | 5.0 | 2 | 1 | 2 |
| (d) Cu Powder | 1.0 | 2.0 | 3.0 | 1.0 | 4.0 | 2 | 1 | 1 |
| Ni Powder | 2.0 | 2.0 | 3.0 | 5.0 | 1.0 | | 1 | 1 |
| Stainless steel powder | | 3.0 | 2.0 | 2.0 | 1.0 | 1 | 2 | 1 |
| Fe Powder | 2.0 | 4.0 | 2.0 | 5.0 | 2.0 | 3 | 2 | 3 |
| ZrO Powder | 1.0 | 4.0 | 2.0 | 3.0 | 1.0 | 2 | | 1 |
| (e) $Ag_2CO_3$ | 1.0 | 1.0 | 0.5 | 1.0 | 1.0 | 1.5 | 0.5 | 0.5 |
| $CuSO_4$ | 1.0 | 1.5 | 0.5 | 2.0 | 1.0 | 1 | 1 | 1 |
| $FeSO_4$ | 1.0 | 1.5 | 1.0 | 2.0 | 1.0 | 2.5 | 1.5 | 0.5 |
| (f) FeF | 1.5 | 1.0 | 2.0 | 2.0 | 2.5 | 1 | 2 | 1 |
| CuF | 2.5 | 2.0 | 3.0 | 2.0 | 3.5 | 2 | 2 | 2 |
| Result Number of charges | 8.60 | 8.53 | 8.76 | 8.67 | 8.70 | 8.47 | 8.32 | 8.35 |
| Life elongation (%) | 11.7 | 10.8 | 13.8 | 12.6 | 13.0 | 10.0 | 8.0 | 8.5 |

COMPARISON EXAMPLES 2 and 3

Coating compositions were prepared as in Example 1 using the following components for the Comparison Examples 2 and 3:

| Component | Comp. Example 2 | Comp. Example 3 |
|---|---|---|
| SiC | 51.0 | 40.0 |
| $Si_3N_4$ | 4.0 | 4.7 |
| $Al(H_2PO_4)_3$ | 5.5 | 7.5 |
| $Cr_2O_3$ | 2.4 | 8.0 |

-continued

| Component | Comp. Example 2 | Comp. Example 3 |
|---|---|---|
| TaC | 3.6 | 2.8 |
| Al Powder | 6.0 | 17.0 |
| $Al_2O_3$ | 2.0 | 2.5 |
| MgO | 1.5 | 2.5 |
| $Fe_2O_3$ | 9.0 | 4.0 |
| Glass Powder | 8.0 | 5.0 |
| $ZrO_2$ | 4.5 | 5.0 |
| $SiO_2$ | 2.5 | 1.0 |

For these coating compositions, tests were carried out as in Example 1. It was observed that about 60% of the coated layer had been scaled off after 2 charges for the coating composition of Comparison Example 2 with a life elongation of 0.05% and, for the coating composition of Comparison Example 3, about 80% of the coated layer had been scaled off after 3 charges with a life elongation of 0.07%.

COMPARISON EXAMPLE 4

An oxidation preventive coating composition according to the Japanese Patent Publication No. 25,256/1979 having a composition of 70% by weight of titanium carbide, 5% by weight of fluorite, 5% by weight of methyl cellulose and 20% by weight of silica was prepared in the manner similar to Example 1.

In the test which was carried out for this coating composition in the same manner as in Example 1, it was found that 80% of the coated layer had been scaled off during the first charge, corresponding to a life elongation of 0%.

What is claimed is:

1. A coating composition for preventing the high temperature oxidation of steelmaking graphite electrodes, which comprises:

(a) 40–75% by weight of silicon carbide as a heat radiation component;

(b) 15–40% by weight of a binding and heat radiation promoting component consisting of 3–20 parts by weight of silicon nitride, 5–20 parts by weight of salt of phosphorous containing acid, 2-10 parts by weight of chromium oxide,
2-10 parts by weight of tantalum carbide, and
5-20 parts by weight of pulverous aluminum;

(c) 10-35% by weight of an additive for improving the adhesion to the graphite electrode and increasing the binding strength between the coated layers, consisting of
1-10 parts by weight of aluminum oxide,
3-15 parts by weight of glass powder,
3-15 parts by weight of zirconium oxide,
1-10 parts by weight of silicon dioxide,
1-10 parts by weight of magnesium oxide, and
1-10 parts by weight of iron oxide;

(d) 5-20% by weight of a metal powder consisting of
0-40 parts by weight of pulverous cooper,
0-40 parts by weight of pulverous nickel,
0-40 parts by weight of pulverous stainless steel
0-40 parts by weight of pulverous iron, and
0-40 parts by weight of pulverous tin;

(e) 2-5% by weight of a sintering promoter mixture consisting of 10-30 parts by weight of silver carbonate, and
30-50 parts by weight of copper sulfate, and/or
30-50 parts by weight of iron sulfate; and (f) 3-7% by weight of a melting point lowering component consisting of
30-60 parts by weight of iron fluoride, and
40-70 parts by weight of copper fluoride;

wherein the total of the above components (a)-(f) add up to 100% by weight.

2. A coating composition according to claim 1, consisting of 40-65% by weight of the component (a), 15-35% by weight of the component (b), 10-18% by weight of the component (c), 6-18% by weight of the component (d), 2-5% by weight of the component (e) and 3-7% by weight of the component (f).

3. A coating composition according to claim 1 or 2, wherein the component (d) consists of 1-40 parts by weight of pulverous copper, 1-40 parts by weight of pulverous nickel, 0.40 parts by weight of pulverous stainless steel, 1-40 parts by weight of pulverous iron and 1-40 parts by weight of pulverous tin.

* * * * *